United States Patent [19]

Fox et al.

[11] Patent Number: 4,634,539
[45] Date of Patent: Jan. 6, 1987

[54] SCAVENGING OXYGEN FROM AQUEOUS SYSTEMS

[76] Inventors: Irwin Fox, 37 Meadowbrook Country Club Estates, Ballwin, Mo. 63011; Alvin Samuels, 444 Fairway Dr., New Orleans, La. 70124

[21] Appl. No.: 710,132
[22] Filed: Mar. 11, 1985
[51] Int. Cl.$^4$ ............................................. C09K 7/04
[52] U.S. Cl. ................................. 252/8.51; 175/64; 252/188.28; 423/219; 423/222
[58] Field of Search ............ 252/8.5 B, 8.5 R, 8.5 A, 252/8.55 D, 188.28; 175/64; 423/219, 222

[56] References Cited

U.S. PATENT DOCUMENTS

| | | | |
|---|---|---|---|
| 3,119,447 | 1/1964 | Raifsnider et al. | 252/8.55 X |
| 3,301,323 | 1/1967 | Parsons | 175/66 |
| 3,625,888 | 12/1971 | Redmore et al. | 252/8.55 |
| 4,008,775 | 2/1977 | Fox | 252/8.5 X |
| 4,059,533 | 11/1977 | Watson et al. | 175/64 X |
| 4,246,243 | 1/1981 | Fox | 252/8.5 |
| 4,246,244 | 1/1981 | Fox | 423/225 |
| 4,324,298 | 4/1982 | Fox | 252/8.55 X |

Primary Examiner—Herbert B. Guynn
Attorney, Agent, or Firm—Jerome A. Gross

[57] ABSTRACT

A composition suitable for scavenging oxygen from aqueous systems, for example those used in well drilling, is provided which comprises a mixture of an oxygen-reactive sulfite and/or bisulfite (sulfite component) and an amount of iron oxide particles sufficient to catalyze the reaction between oxygen and the sulfite component. These particles have certain properties as further described herein. These compositions also serve as corrosion inhibitors in aqueous systems, such as drilling muds, to protect steel components from corrosion. A method is also provided for using such compositions in aqueous systems to scavenge oxygen from such systems, and also H$_2$S, if present.

9 Claims, No Drawings

SCAVENGING OXYGEN FROM AQUEOUS SYSTEMS

TECHNICAL FIELD

This invention relates to compositions of certain particulate iron oxides together with an oxygen-reactive sulfite compound, and the use of same to scavenge or react with oxygen in aqueous systems such as in well drilling, and particularly aqueous systems which contain soluble sulfides, one of which may be hydrogen sulfide.

BACKGROUND ART

It is known that oxygen in aqueous systems will react with sodium sulfite or ammonium bisulfite and thus can be removed as such from such system by treating the system with such sulfite. However, the reaction between oxygen and such sulfite is too slow to be of practical value, and cobalt and various derivatives thereof have been used to speed up the reaction of oxygen and the sulfite. While such catalysts have been effective in an essentially sulfide free aqueous system, they are poisoned or rendered relatively ineffective by soluble sulfides, for example, sodium sulfide and/or hydrogen sulfide. Consequently there is a marked loss of sulfite-oxygen reactivity with wuch catalyst in aqueous systems containing soluble sulfides.

It is also known, for example, from U.S. Pat. No. 4,246,244, issued Jan. 20, 1981, (hereinafter the "244" patent), that certain iron oxides, described therein, will effectively scavenge hydrogen sulfide (hereafter $H_2S$) from aqueous systems. However, such iron oxides have no practical value for the scavenging of oxygen from aqueous systems.

DISCLOSURE OF THE INVENTION

It is an object of this invention to provide a composition which effectively catalyzes the reaction of oxygen with sulfites and/or bisulfites in an aqueous system, and which substantially retains its catalytic activity in aqueous systems containing water soluble sulfides. It is a further object of this invention to provide a method of scavenging oxygen from aqueous systems, particularly those containing water soluble sulfides, using such compositions, and to obtain corrosion resistance, as well, when such compositions are employed in drilling muds containing $H_2S$.

The present invention provides a composition of certain iron oxide particles, as more fully described hereafter, and oxygen-reactive, water-soluble sulfites and/or bisulfites, such as sodium sulfite (or $Na_2SO_3$) or ammonium bisulfite (or $NH_4HSO_3$), (hereinafter sometimes called the sulfite component) useful for scavenging oxygen, and $H_2S$, if present, from aqueous systems containing same. These particles not only serve as a catalyst for the reaction between the sulfites and/or bisulfites and oxygen in aqueous systems, but are substantially resistant to poisoning or deactivation when employed in aqueous systems containing water-soluble sulfides. Further, such compositions serve as effective corrosion inhibitors protecting iron or steel surfaces from corrosion in the presence of such aqueous systems—as will be more fully described and explained in the subsequent description.

The iron oxides employed in these compositions are exceptionally $H_2S$-reactive iron oxide particles described in detail in the aforesaid "244" patent, the entire description of which is hereby incorporated herein by reference. More particularly, the iron oxide particles described as Compound A in said "244" patent, which form part of the compositions of the present invention (hereinafter referred to as iron oxide particles of Form A), comprise forms of iron oxide particles of a large surface area having an amorphous (non-crystalline) moiety of $Fe_2O_3$ together with an $Fe_3O_4$ or $Fe_2O_3$ crystalline phase, and impurity levels in bulk of less than 10% with respect to any contaminating element. Upon reaction with hydrogen sulfide, these iron oxides are converted to products which do not regenerate $H_2S$ in the presence of strong acids.

The present invention also provides a method of scavenging oxygen from aqueous systems containing same by contacting the oxygen present in such system with the aforesaid compositions and continuing such contacting until the oxygen is completely scavenged from the system or is reduced to a predetermined level. The presence of water-soluble sulfides in the system does not significantly diminish the catalytic efficiency of the composition and the oxygen reacts rapidly with the sulfite or bisulfite present in the composition even when the composition is exposed for long periods of time to water-soluble sulfides in the system.

This method is also particularly applicable to the scavenging of oxygen and $H_2S$ from aqueous systems containing these elements. In view of this, the method of this invention is particularly useful when applied to oil and gas well drilling muds. By incorporating the compositions of the present invention in such muds, it is not only possible to scavenge the oxygen and $H_2S$ encountered in a drilling operation, but it is also possible to substantially minimize the iron or steel pipe corrosion which is normally encountered in drilling operations when $H_2S$ is encountered. It has been observed when the compositions of this invention are employed in drilling muds that a protective film or coating, often having a gunbarrel-like bluish appearance, is formed on steel drilling pipe, and such coating effectively inhibits corrosion of the pipe, thus effectively reducing wash-outs and twist-offs in the drilling operation.

BEST MODE FOR CARRYING OUT THE INVENTION

Compositions

The compositions of this invention preferably comprise an intimate mixture of iron oxide particles of Form A, hereinabove referried to, and solid particles of sodium sulfite and/or ammonium sulfite. Such mixture is desirably free flowing and may contain dessicants or other moisture-absorbing materials for that purpose. The compositions may also contain particulate acidic, alkaline and/or buffering materials for pH control in the use of the compositions. However, in most cases it is preferred to add such materials, if needed, after the compositions have been added to the aqueous system which is being treated.

The amount of iron oxide particles used in relation to the sulfite component will vary depending on the primary functional use of the composition, but in most instances will be in a weight ratio of about 90:10 to about 10:90, of iron oxide to sulfite component. If the composition is to be used for scavenging oxygen from an aqueous system essentially free of $H_2S$, the composition will usually contain the iron oxide particles and sulfite component in a weight ratio of about 10:90 to about 60:40, preferably in a weight ratio of about 30:70 to about 60:40. On the other hand, if the composition is to be used in aqueous systems, for example, drilling muds, which contain or are brought into contact with $H_2S$, then a larger weight ratio of iron oxide to sulfite component is usually employed to insure scavenging of the $H_2S$ encountered. Weight ratios of iron oxide to sulfite in the range of about 40:60 to about 90:10 are usually adequate for such use.

The iron oxide particles of Form A used in the compositions of the present invention have the characteristics hereinabove referred to. The preferred iron oxide particles of Form A used are those prepared conventionally by controlled low temperature oxidation of iron and have a surface area of at least 3.5 $m^2/g$, a kinetic "K" value of at least 1000, and which are composed of an $Fe_3O_4$ crystalline phase, substantially free of crystalline $Fe_2O_3$, and an amorphous $Fe_2O_3$ moiety. Iron oxide particles having these characteristics and properties are also described in the aforesaid "244" patent and in U.S. Pat. No. 4,008,775 (hereinafter the "775" patent), the disclosure of which is hereby incorporated in the present description by reference.

As to the kinetic "K" value in the above description in the pH range 8–10, the derived rate law for iron oxide particles of Form A is as follows:

$$d[S_t]/dt = K \times [S_t]^2 \times [H^+]^{1.06} \times [A]$$

wherein $[S_t]$ is sulfide concentration in ppm, t is time in minutes, $d[S_t]dt$ is the instantaneous rate of change of dissolved sulfide concentrations, $[H^+]$ is hydrogen ion concentration, $[A]$ is iron oxide concentration (lb/bbl) and K is the rate constant in min.$^{-1}$ppm$^{-1}$cm$^2 \times$ 1/mole and equal to approximately 2000. At pH 8–10, the derived rate law agrees closely with Rickard's analysis of the reaction of hydrated iron oxide (ferric hydroxide) and hydrogen sulfide [Am. J. Sci., 274:941 (1974)]. When $[S_t]$ and $[H^{30}]$ are measured intermittently during the course of continuous acid reaction, the substitution of observed $[S_t]$ and $[DH^{30}]$ values into the rate law equation above yields apparent K values which define relative differences in reaction rates among different iron oxides.

Methods

As indicated above, the present invention provides a method for scavenging oxygen from aqueous systems utilizing the above-described compositions in such systems. While it is preferred to add the compositions to such systems, the iron oxide particles and the sulfite component may be added separately with the iron oxide particles preferably being added first. Thus, in carrying out the method it is preferred that the scavenging or reaction of oxygen and the sulfite component be carried out in the presence of the iron oxide particles. As noted, the iron oxide particles catalyze the reaction of oxygen and the sulfite component, and this catalysis is not significantly diminished even when the aqueous system being treated contains water-soluble sulfides which poison other catalysts under these conditions. The method is not very pH sensitive, and can be practiced under acidic or alkaline conditions, but is preferably practiced under alkaline conditions and usually at a pH in the range of about 8 to about 10.5. Generally, the $O_2$ content of the aqueous system can be reduced to less than 0.5 ppm in less than 10 minutes of treatment.

In practicing the method, it is desirable to bring about an intimate contact between the oxygen present in the aqueous system and the sulfite component. Various kinds of apparatus for providing such contact will be apparent to those skilled in the art to which this invention pertains. For example, a simple tank equipped with an agitator revolving at about 100 RPM will provide adequate contact. In other installations, for example flowing systems, no special apparatus may be required. The amount of composition used should be sufficient to provide enough sulfite component to react with all or that portion of the oxygen in the aqueous system desired to be scavenged or removed.

As noted previously herein, the method of this invention is particularly applicable to the scavenging of both oxygen and $H_2S$ from aqueous systems containing these elements, and is more particularly applicable to methods utilizing the compositions of this invention in drilling muds for drilling oil or gas wells. The use of iron oxide particles of Form A in drilling muds has been described in the aforementioned "775" patent. As is mentioned in said patent, $H_2S$ is frequently encountered in drilling oil and gas wells, and is corrosive to drill pipe and casing, both of which are usually made of steel. When a drill pipe breaks due to $H_2S$ embrittlement, the drilling operation must be interrupted and the drill pipe string repaired. $H_2S$ is also a pollutant to the environment and a health hazard. It should also be noted that oxygen and carbon dioxide are usually present in aqueous drilling muds and/or are encountered in drilling operations. The "775" patent also discloses that iron oxide particles of Form A effectively scavenge $H_2S$ from drilling muds and improve the rheological properties and thermal stability of the muds, while also serving as a weighting agent.

While iron oxide particles of Form A do significantly reduce the corrosion and embrittlement of drill pipe and casing employed in oil or gas well drilling, some corrosion and embrittlement may occur, in the method of the "775" patent, because of some $H_2S$ contacting the pipe or casing before reacting with the iron oxide and being scavenged from the mud. By practicing the present inventive method of incorporating the compositions of this invention in the drilling mud, not only are oxygen and $H_2S$ scavenged from the mud, but a protective film or coating is formed on the drill pipe or casing, thus considerably minimizing corrosion or embrittlement of the drill pipe or casing. For so scavenging both hydrogen sulfide and oxygen in drilling muds, about 1 to 20 pounds of the iron oxide particles and about 0.1 to about 2.0 pounds of sulfite component, for each pound of iron oxide, are added per barrel of mud depending on the $H_2S$ and oxygen present or to be encountered, and sufficient other additives to provide a mud having the requisite rheological properties. These ranges are not critical, and more or less of the iron oxide and sulfite component can be used.

In carrying out the method the mud serves as a lubricant and is circulated down the interior of the drill pipe, through the drill bit and up the annular space (annulus) between the drill pipe and the formation wall or casing to the surface. It thus removes the heat produced by the cutting action of the bit as well as the cuttings themselves, carrying them from the drill bit and up the annulus to the surface, where they are separated. In the annulus, the mud reduced the drag of the rotating drill pipe and provides sufficient hydrostatic pressure to contain any liquid or gaseous component within the formation being penetrated. Also, the iron oxide particles are thermally stable under the pressure and temperature conditions experienced in oil or gas well drilling.

The drilling muds used may contain conventional additives, for example, weighting agents, such as bentonite or barite; lubricants such as lignosulfonates or tannins; and biocides such as phenol, cresol, formaldehyde or the like, which additives may be used in conventional quantities or somewhat lesser quantities. As previously noted, the components of the compositions of this invention form a protective film or coating on the drill pipe and casing surfaces and thereby effectively inhibit corrosion or embrittling of the drill pipe and casing.

The following specific examples are intended to illustrate the compositions and methods of the invention described herein, but are not to be construed as limiting the scope of the present invention.

EXAMPLE I

A body of water containing about 8.2 ppm of $O_2$ and having a pH of about 9.0 was treated with a mixture of (a) iron oxide particles having a surface area of at least 3.5 3.5 m$^2$/g, a kinetic "K" value of at least 1000 and composed of a crystalline phase of $Fe_3O_4$, substantially free of crystalline $Fe_2O_3$, and an amorphous $Fe_2O_3$ moiety, and (b) solid sodium sulfite particles, the sodium sulfite used being sufficient to react with the $O_2$ present and equal in weight to the iron oxide particles. The resulting aqueous system was well agitated. In less than two minutes the $O_2$ content of the water had been reduced to less than 0.5 ppm.

Substantially identical results were obtained by substituting ammonium bisulfite for the sodium sulfite.

In contrast, when water of the same oxygen content and pH was treated with sodium sulfite per se, there was essentially no further reaction after the $O_2$ content was reduced from 8.2 ppm to about 6.2 ppm after about 15 minutes. With ammonium bisulfite, on the other hand, the $O_2$ content was reduced from about 8.2 ppm to about 0.5 ppm after about 53 minutes of reaction.

EXAMPLE II

A body of water containing about 8.2 ppm of $O_2$ and 322 ppm of soluble sulfides and having a pH of about 9.0 was treated, while well agitated, with a mixture of iron oxide particles and sodium sulfite using the same ingredients and quantities as described in EXAMPLE I. In less than two minutes the $O_2$ content had been reduced to less than 0.5 ppm.

A body of water containing 8.2 ppm of $O_2$ and 1290 ppm of soluble sulfides and having a pH of about 9.0 was treated in the same manner as described in the preceding paragraph. In less than five minutes the $O_2$ content of the water had been reduced to less than 0.5 ppm.

By way of contrast, when a aqueous system having the same conpositions as that described in this EXAMPLE II, but having 250 ppm of soluble sulfides, was treated with cobalt catalyzed sodium sulfite (equal parts of each), while well agitated, the $O_2$ content of the water was reduced only to about 2 ppm of $O_2$ after about 40 minutes of treatment.

EXAMPLE III

The experiments described in the first two paragraphs of EXAMPLE II were repeated except that ammonium bisulfite was used instead of sodium sulfite. The results obtained with ammonium bisulfide were substantially the same as with the sodium sulfite treatment, with respect to speed and extent of $O_2$ reduction.

EXAMPLE IV

A drilling mud composed of a water base of bentonite and containing small amounts of sodium carbonate to buffer the pH at about 10 and containing a small amount of lignosulfonate was prepared. To this was added sufficient oxygen to provide an $O_2$ content of about 8 ppm and sufficient $H_2S$ to provide about 1000 ppm to the drilling mud. This mud was heated to 95° F. and there was added to the mud a mixture of iron oxide particles (of the same composition as described in EXAMPLE I) and sodium sulfite, the mixture being used in an amount of about 15 pounds of the oxide and two pounds sulfite per barrel of drilling mud. Specimens of a normalized and tempered Grade E steel drill pipe and a high strength grade steel pipe were immersed in the drilling mud which was continuously circulated past the specimens for a period of two days. During this run the $O_2$ and $H_2S$ were effectively scavenged from the drilling mud and no significant corrosion of the specimen pipe was noted. It was observed that both specimens of pipe had acquired a film or coating which was gunbarrel-like and bluish in appearance.

It is believed, based on our knowledge of the chemical, physical and rheological properties of the iron oxide particles referred to as compounds B, C and D in the aforesaid "244" patent, that such iron oxide particles should give results equivalent to those obtained with the iron oxide particles of Form A described herein, and should be equivalent thereto. The iron oxide particles exemplified by said compounds B, C and D can be characterized as having a surface area of at least 4 m$^2$/g, a kinetic "K" value greater than 20 and comprising a crystalline phase portion of $Fe_2O_3$, $Fe_3O_4$ or combination thereof together with an amorphous $Fe_2O_3$ phase.

INDUSTRIAL APPLICABILITY

The most outstanding use of this invention is, as in well drilling, when both hydrogen sulfide and oxygen are to be scavenged; but it is also highly useful in those aqueous systems where only oxygen is to be scavenged, as the catalyst for sulfite compounds incorporated.

The embodiments of the invention in which an exclusive property or privilege is claimed are defined as follows:

1. A composition comprising a mixture of (a) particulates of an oxygen-reactive, water-soluble sulfite and/or a bisulfite, and (b) iron oxide particles having a surface area of at least 3.5 m$^2$/g, a kinetic "K" value of at least 1000 and composed of an $Fe_3O_4$ crystalline phase, substantially free of crystalline $Fe_2O_3$, and an amorphous $Fe_2O_3$ moiety, said iron oxide being present in an amount sufficient to catalyze the reaction between said sulfite or bisulfite and oxygen in an aqueous system.

2. A composition as in claim 1, wherein said sulfite is sodium sulfite and the composition contains said iron oxide and sulfite in weight ratios of about 10:90 to about 90:10.

3. A composition as in claim 1, wherein said bisulfite is ammonium bisulfite and the composition contains said iron oxide and bisulfite in weight ratios of about 10:90 to about 90:10.

4. A method of scavenging oxygen from an aqueous system containing same, which comprises treating said system with (a) an oxygen-reactive water-soluble sulfite and/or bisulfite in an amount sufficient to reduce the oxygen content of said system to a predetermined level, and (b) iron oxide particles having a surface area of at least 3.5 m$^2$/g, a kinetic "K" value of at least 1000 and composed of an Fe$_3$O$_4$ crystalline phase, substantially free of crystalline Fe$_2$O$_3$, and an amorphous Fe$_2$O$_3$ moiety, said iron oxide being present in an amount sufficient to catalyze the reaction between said sulfite and/or bisulfite and oxygen, and continuing said treatment until the oxygen content in said system has been reduced to the predetermined level.

5. A method as in claim 4, wherein said sulfite or bisulfite is sodium sulfite or ammonium bisulfite, and said sulfite or bisulfite and iron oxide are present in a weight ratio of about 10:90 to about 90:10.

6. A method of scavenging oxygen from aqueous systems containing oxygen and water soluble sulfides, which comprises treating said system with (a) an oxygen-reactive, water-soluble sulfite and/or bisulfite in an amount sufficient to reduce the oxygen content of said system to a predetermined level and (b) iron oxide particles having a surface area of at least 3.5 m$^2$/g, a kinetic "K" value of at least 1000 and composed of an Fe$_3$O$_4$ crystalline phase, substantially free of crystalline Fe$_2$O$_3$, and an amorphous Fe$_2$O$_3$ moiety, said iron oxide being present in an amount sufficient to catalyze the reaction between said sulfite or bisulfite and oxygen in said aqueous system.

7. A method as in claim 6, wherein said sulfite or bisulfite is sodium sulfite or ammonium bisulfite, and said sulfite or bisulfite and iron oxide are present in a weight ratio of about 10:90 to about 90:10.

8. A method of scavenging oxygen and H$_2$S from an aqueous drilling mud, which comprises the following steps:
    a. adding to said drilling mud (1) an oxygen-reactive, water-soluble sulfite and/or bisulfite in an amount sufficient to reduce the oxysgen content of said mud to a predetermined level and (2) iron oxide particles having a surface area of at least 3.5 m$^2$/g, a kinetic "K" value of at least 1000 and composed of an Fe$_3$O$_4$ crystalline phase, substantially free of crystalline Fe$_2$O$_3$, and an amorphous Fe$_2$O$_3$ moiety, in an amount sufficient to catalyze the reaction of said sulfite and/or bisulfite and oxygen in said mud and to react with such H$_2$S as may be encountered,
    b. circulating the drilling mud down the interior of a drill pipe, through a drill bit and up the annular space between the drill pipe and the formation wall to the surface,
    c. entraining in the circulating mud such oxygen and H$_2$S as may be encountered, and
    d. reacting the entrained oxygen with said sulfite and/or bisulfite and reacting the entrained H$_2$S with said iron oxide under the pressure so present to form a stable reaction product.

9. A method as in claim 8, wherein said sulfite and/or bisulfite is sodium sulfite or ammonium bisulfite and said drill pipe is made of steel, whereby a corrosion inhibiting film is formed on the surfaces of said drill pipe.

* * * * *

UNITED STATES PATENT AND TRADEMARK OFFICE
CERTIFICATE OF CORRECTION

PATENT NO. : 4,634,539

DATED : January 6, 1987

INVENTOR(S) : Irwin Fox, et al

It is certified that error appears in the above-identified patent and that said Letters Patent is hereby corrected as shown below:

Column 1, line 27, "wuch" should be ---such---.

Column 2, line 50, "referried" should be ---referred---.

Column 3, line 38, "$[H^{3O}]$" should be ---$[H^+]$---.

Column 3, line 40, "$[DH^{3O}]$" should be ---$[H^+]$---.

Column 4, line 65, "reduced" should be ---reduces---.

Column 5, line 23, "3.5" is repeated twice, delete the first "3.5".

Column 5, line 56, "a" should be ---an---.

Column 5, line 57, "conpositions" should be ---compositions---.

Signed and Sealed this

Twenty-eighth Day of April, 1987

Attest:

DONALD J. QUIGG

Attesting Officer

Commissioner of Patents and Trademarks